United States Patent
Kano et al.

(10) Patent No.: US 9,623,911 B2
(45) Date of Patent: Apr. 18, 2017

(54) REAR PART STRUCTURE OF VEHICLE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Hiroaki Kano, Okazaki (JP); Satoru Takahashi, Okazaki (JP); Masato Nakamura, Okazaki (JP); Toshiaki Isogai, Nagoya (JP); Atsushi Ogita, Okazaki (JP); Syunichiro Ohma, Okazaki (JP); Yuichi Miyake, Nagoya (JP); Hiroyuki Inoue, Nagoya (JP); Muneaki Kato, Okazaki (JP); Hiroki Arai, Nagoya (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/834,029

(22) Filed: Aug. 24, 2015

(65) Prior Publication Data
US 2016/0052556 A1 Feb. 25, 2016

(30) Foreign Application Priority Data
Aug. 25, 2014 (JP) .................... 2014-170118

(51) Int. Cl.
*B62D 25/08* (2006.01)
*B62D 21/15* (2006.01)
(Continued)

(52) U.S. Cl.
CPC ............ *B62D 21/155* (2013.01); *B62D 21/11* (2013.01); *B62D 25/087* (2013.01); *B62D 25/12* (2013.01); *B62D 25/2027* (2013.01)

(58) Field of Classification Search
CPC ... B62D 25/08; B62D 25/2027; B62D 21/155
(Continued)

(56) References Cited

U.S. PATENT DOCUMENTS 6,834,910 B2 * 12/2004 Wendland ............ B62D 21/152
296/187.01
7,677,651 B2 * 3/2010 Yamaguchi ........ B62D 25/2027
296/187.11
(Continued)

FOREIGN PATENT DOCUMENTS

DE 19707568 C1 7/1998
EP 0603574 A1 6/1994
JP 4867509 B2 2/2012

*Primary Examiner* — Dennis H Pedder
(74) *Attorney, Agent, or Firm* — Birch, Stewart, Kolasch & Birch, LLP

(57) ABSTRACT

A rear part structure of a vehicle includes: a pair of right and left rear side members; a pair of side sills which are connected to the rear side members; a pair of sub frame side members respective one ends of which are connected to connecting parts between the rear side members and the side sills, the sub frame side members being extended to a rear side of the vehicle, in a manner inclined inward in a lateral direction of the vehicle; and a sub frame center member one end of which is connected to the other ends of the sub frame side members, the sub frame center member being extended to the rear side of the vehicle.

6 Claims, 5 Drawing Sheets

(51) Int. Cl.
    *B62D 25/12*  (2006.01)
    *B62D 21/11*  (2006.01)
    *B62D 25/20*  (2006.01)
(58) Field of Classification Search
    USPC .... 296/203.01, 203.04, 193.08, 209, 187.08,
    296/187.11
    See application file for complete search history.

(56) References Cited

U.S. PATENT DOCUMENTS

| | | | |
|---|---|---|---|
| 7,950,724 B2 * | 5/2011 | Yamaguchi | B60K 15/063 296/187.11 |
| 2007/0096508 A1 * | 5/2007 | Rocheblave | B62D 21/152 296/193.07 |
| 2010/0052368 A1 | 3/2010 | Yamaguchi et al. | |
| 2013/0020139 A1 * | 1/2013 | Kim | B60K 1/04 180/68.5 |

* cited by examiner

REAR PART STRUCTURE OF VEHICLE

CROSS-REFERENCE TO RELATED APPLICATION(S)

This application is based upon and claims the benefit of priority from prior Japanese patent application No. 2014-170118, filed on Aug. 25, 2014, the entire contents of which are incorporated herein by reference.

BACKGROUND

The present invention relates to a rear part structure of a vehicle.

As a structure of a sub frame, for example, Japanese Patent No. 4867509 discloses a related art in which a sub frame includes a connecting member which is extended in a vertical direction of a vehicle and connected to a side member, and a reinforcing member which is extended in a longitudinal direction of the vehicle, thereby to realize a predetermined deformation in the event of collision, and to absorb a shock.

In the related art which is disclosed in Japanese Patent No. 4867509, shock absorption by deformation of the sub frame is attained. However, because the connecting member is extended in the vertical direction of the vehicle, the shock is unlikely to be transmitted to the side member, and so, it is difficult to realize the shock absorption by converting the shock to acceleration of the vehicle.

SUMMARY

In view of the above, an object of the invention is to provide a rear part structure of a vehicle in which a shock can be efficiently absorbed, by converting the shock to acceleration of the vehicle, when the vehicle is collided from the back.

In order to achieve the above object, according to an aspect of the invention, there is provided a rear part structure of a vehicle, the rear part structure comprising: a pair of right and left rear side members; a pair of side sills which are connected to the rear side members; a pair of sub frame side members respective one ends of which are connected to connecting parts between the rear side members and the side sills, the sub frame side members being extended to a rear side of the vehicle, in a manner inclined inward in a lateral direction of the vehicle; and a sub frame center member one end of which is connected to the other ends of the sub frame side members, the sub frame center member being extended to the rear side of the vehicle.

The sub frame center member may be a pair of members which are separated from each other in the lateral direction of the vehicle.

The rear part structure may further comprise a sub frame bumper beam which is extended in the lateral direction of the vehicle, and against which the other ends of the sub frame center members are butted.

The rear part structure may further comprise: a rear floor cross member which is connected to the pair of the rear side members, and which is extended in the lateral direction of the vehicle; and a sub frame cross member which interconnects one ends of the sub frame center members. The sub frame cross member may be disposed in rear of the rear floor cross member in a position overlapped with respect to the rear floor cross member in a vertical direction of the vehicle.

The sub frame bumper beam may interconnect rear ends of the rear side members.

The vehicle may be an electric vehicle which is provided with a battery pack for driving the electric vehicle, and the battery pack may be positioned between the respective one ends of the sub frame side members.

DETAILED DESCRIPTION OF EXEMPLARY EMBODIMENTS

Figure 1:
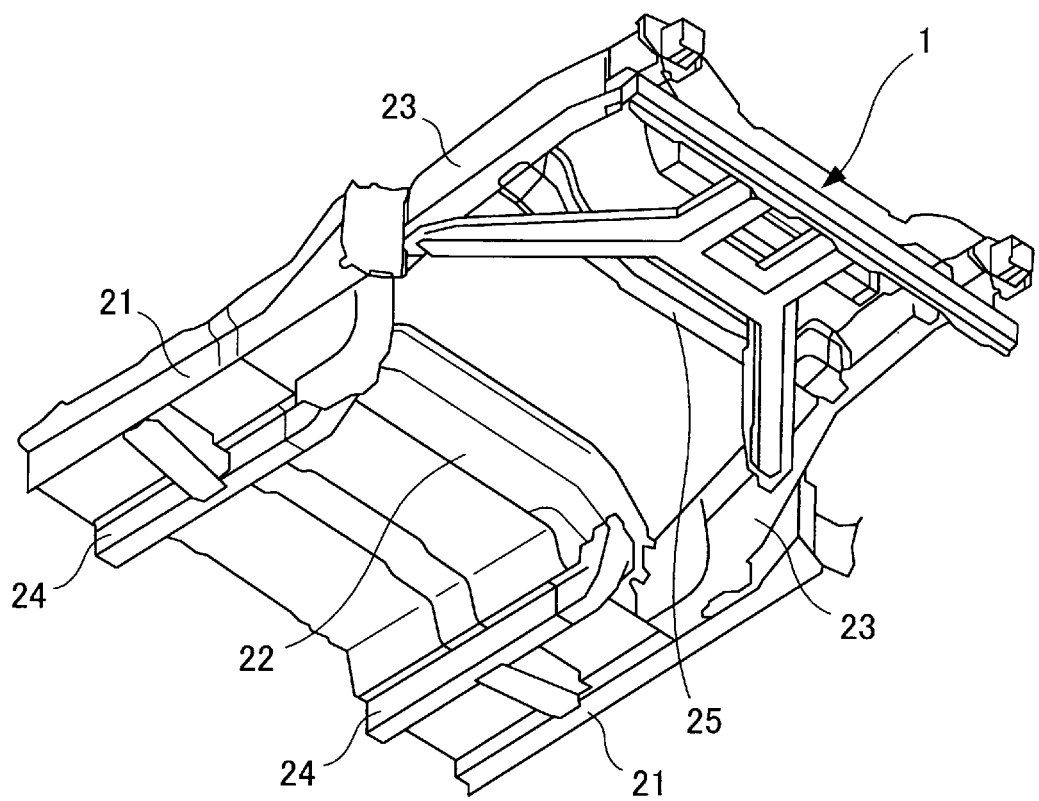
FIG. 1 is a perspective view showing a rear part structure of a vehicle according to an embodiment 1 of the invention.

Now, the rear part structure of the vehicle according to the invention will be described by way of the embodiments, referring to the drawings.

Embodiment 1

FIG. 1 is a perspective view showing the rear part structure of the vehicle according to an embodiment 1 of the invention.

As shown in FIG. 1, the rear part structure of the vehicle according to the embodiment 1 of the invention includes a sub frame 1, side sills 21, a rear seat cross member 22, rear side members 23, floor side members 24, and a rear floor cross member 25.

The side sills 21 are respectively extended in a longitudinal direction of the vehicle, at respective opposite ends in a lateral direction of the vehicle. Moreover, a pair of the side sills 21 are respectively connected to the rear side members 23.

The rear seat cross member 22 is extended in the lateral direction of the vehicle so as to interconnect the side sills 21, at a rear side of the vehicle.

A pair of the right and left rear side members 23 are respectively extended in the longitudinal direction of the vehicle, at opposite sides in the lateral direction of the vehicle. Each one end of the rear side members 23 is connected to a connecting part between the side sill 21 and the rear seat cross member 22. Moreover, the rear side members 23 are disposed at an upper position than the side sills 21.

The floor side members 24 are respectively extended in the longitudinal direction of the vehicle, more inward than the side sills 21 in the lateral direction of the vehicle. Respective one ends of the floor side members 24 are fixed to the rear seat cross member 22.

The rear floor cross member 25 is connected to a pair of the rear side members 23, in a substantially center part in the longitudinal direction of the vehicle, and extended in the lateral direction of the vehicle.

Moreover, the sub frame 1 is fixed to the rear side members 23 from a bottom side. Now, a structure of the sub frame 1 will be described.

Figure 2:
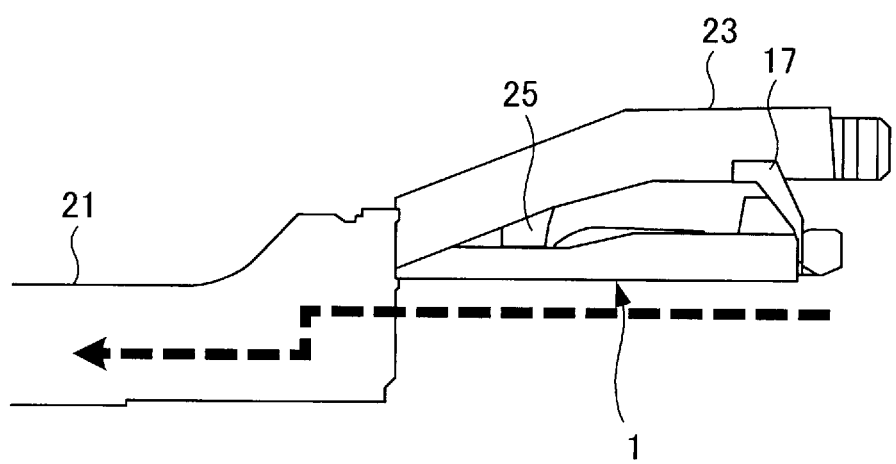
FIG. 2 is a side view showing the rear part structure of the vehicle according to the embodiment 1 of the invention.
Figure 3:
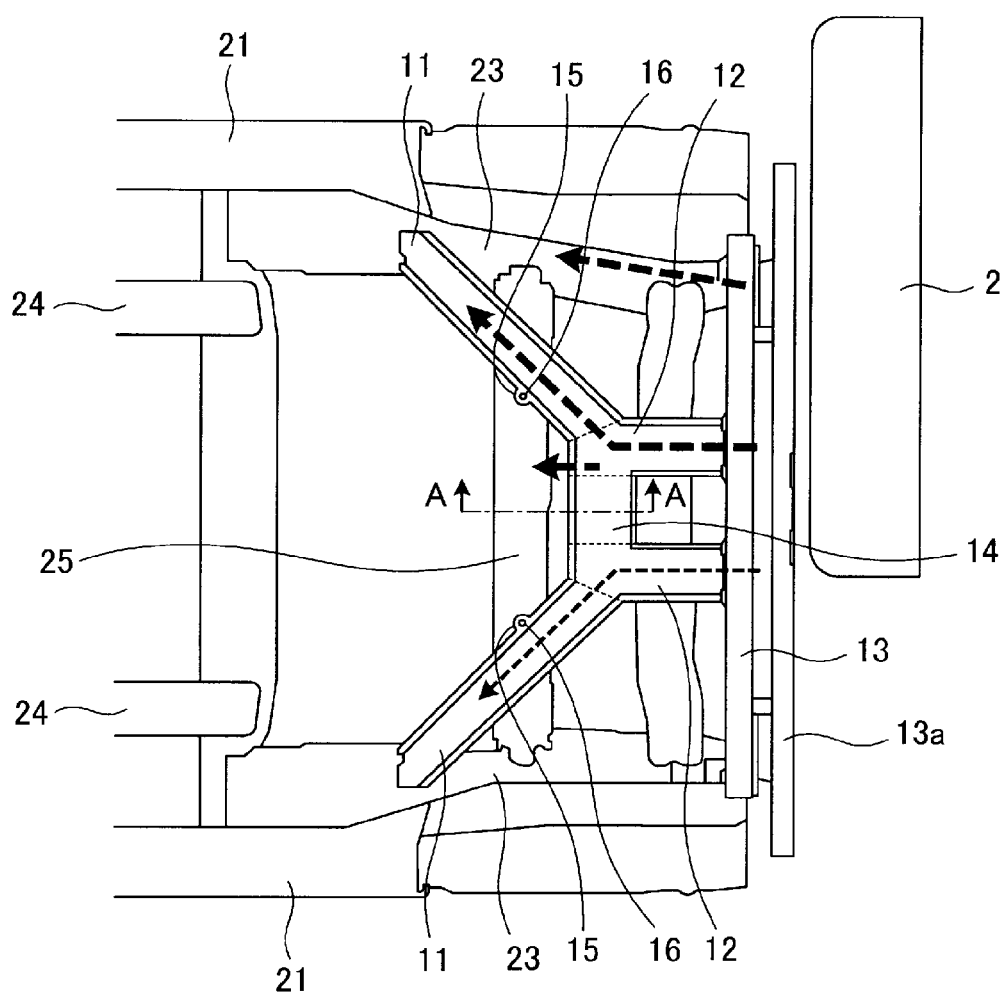
FIG. 3 is a bottom view showing the rear part structure of the vehicle according to the embodiment 1 of the invention.
Figure 4:
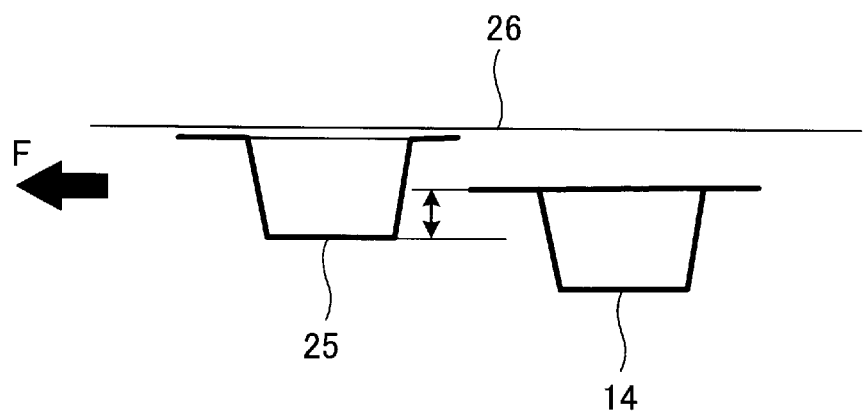
FIG. 4 is a sectional view taken along a line A-A in FIG. 3.

FIG. 2 is a side view showing the rear part structure of the vehicle according to the embodiment 1 of the invention. Moreover, FIG. 3 is a bottom view showing the rear part structure of the vehicle according to the embodiment 1 of the invention. Further, FIG. 4 is a sectional view taken along a line A-A in FIG. 3.

The sub frame 1 is disposed below the rear side members 23 and the rear floor cross member 25. The sub frame 1 has a closed sectional shape, and includes sub frame side members 11, sub frame center members 12, a sub frame bumper beam 13, and a sub frame cross member 14.

The sub frame side members 11 are a pair of members which are respectively positioned below the rear side members 23. Each one end of the sub frame side members 11 is connected to a connecting part between the rear side member 23 and the side sill 21 from the bottom side, and extended to the rear side of the vehicle in a manner inclined inward in the lateral direction of the vehicle. Moreover, each of the sub frame side members 11 is provided with a flange 15 having a bolt hole, and fixed to the rear floor cross member 25 with a bolt 16.

The sub frame center members 12 are a pair of members which are respectively connected to the other ends of the sub frame side members 11, and extended to the rear side of the vehicle in a manner separated from each other in the lateral direction of the vehicle.

The sub frame bumper beam 13 supports a bumper 13a, and extends in the lateral direction of the vehicle so as to interconnect the other ends of the rear side members 23. Moreover, the other ends of the sub frame center members 12 are butted against the sub frame bumper beam 13.

The sub frame cross member 14 interconnects the respective one ends of the sub frame center members 12. Moreover, the sub frame cross member 14 is disposed in rear of the rear floor cross member 25 in an overlapped position with respect to the rear floor cross member 25 in the vertical direction of the vehicle.

Moreover, as shown in FIG. 2, the sub frame 1 is disposed below the rear side members 23 and the rear floor cross member 25, and therefore, a deviation with respect to the side sill 21 in the vertical direction of the vehicle is reduced, as seen in aside view. By reducing this deviation, a load in the event of collision from the back is efficiently transmitted to the side sill 21, and the shock can be converted to the acceleration of the vehicle, as shown by a broken line arrow in FIG. 2.

On the other hand, in a state where the sub frame 1 is not provided, there is a large deviation between the rear side member 23 and the side sill 21 in the vertical direction of the vehicle. Therefore, only the rear side member 23 is deformed, when the vehicle is collided from the back, and accordingly, it is difficult to transmit the load to the side sill 21.

From a viewpoint of the shock absorption, it is desirable that the sub frame 1 is disposed at the same height as the side sill 21. However, in such a position, the sub frame 1 comes into contact with a tire, a rear suspension cross member, and so on (not shown) which are located below. Therefore, the sub frame 1 is actually disposed at a rather higher position than the side sill 21.

Moreover, in a state where the sub frame 1 is not provided, when the vehicle is collided offset by a counter vehicle 2, as shown in FIG. 3, the load is transmitted from the rear side members 23 to the side sills 21. However, because the rear side members 23 are disposed at the opposite end sides of the vehicle independently from each other, the load can be transmitted only to the side sill 21 at a collided side.

However, in a state where the sub frame 1 is provided, when the vehicle is collided offset by the counter vehicle 2, the load can be also transmitted to a not collided side, as shown in FIG. 3. Broken line arrows in FIG. 3 represent transmission of the load in the event of the offset collision. Thicker broken line arrows mean that the transmitted loads are larger.

Specifically, in the rear part structure of the vehicle according to the embodiment 1 of the invention, it is possible to transmit the load also to the side sill 21 at the not collided side, in the event of offset collision, by means of the sub frame bumper beam 13 extended in the lateral direction of the vehicle and the sub frame center members 12 disposed inward in the lateral direction, and thus, the shock can be dispersed. Moreover, because the sub frame bumper beam 13 is connected to the respective rear side members 23, it is possible to transmit the shock also to the rear side members 23, and hence, the shock can be more likely to be converted to the acceleration of the vehicle.

Moreover, as shown in FIG. 4, by disposing the sub frame cross member 14 in an overlapped position with respect to the rear floor cross member 25 in the vertical direction of the vehicle, the sub frame cross member 14 is moved to a front side of the vehicle with the load transmitted from the sub frame center members 12, in the event of collision from the back. As the results, the sub frame cross member 14 is brought into contact with the rear floor cross member 25, and the load can be transmitted to the rear floor cross member 25. Accordingly, it is possible to more easily convert the shock to the acceleration of the vehicle.

It is to be noted that a bidirectional arrow in FIG. 4 represents overlapping between the sub frame cross member 14 and the rear floor cross member 25 in the vertical direction of the vehicle, and a thick arrow F represents a direction of a shock caused by the collision from the back.

Figure 5:
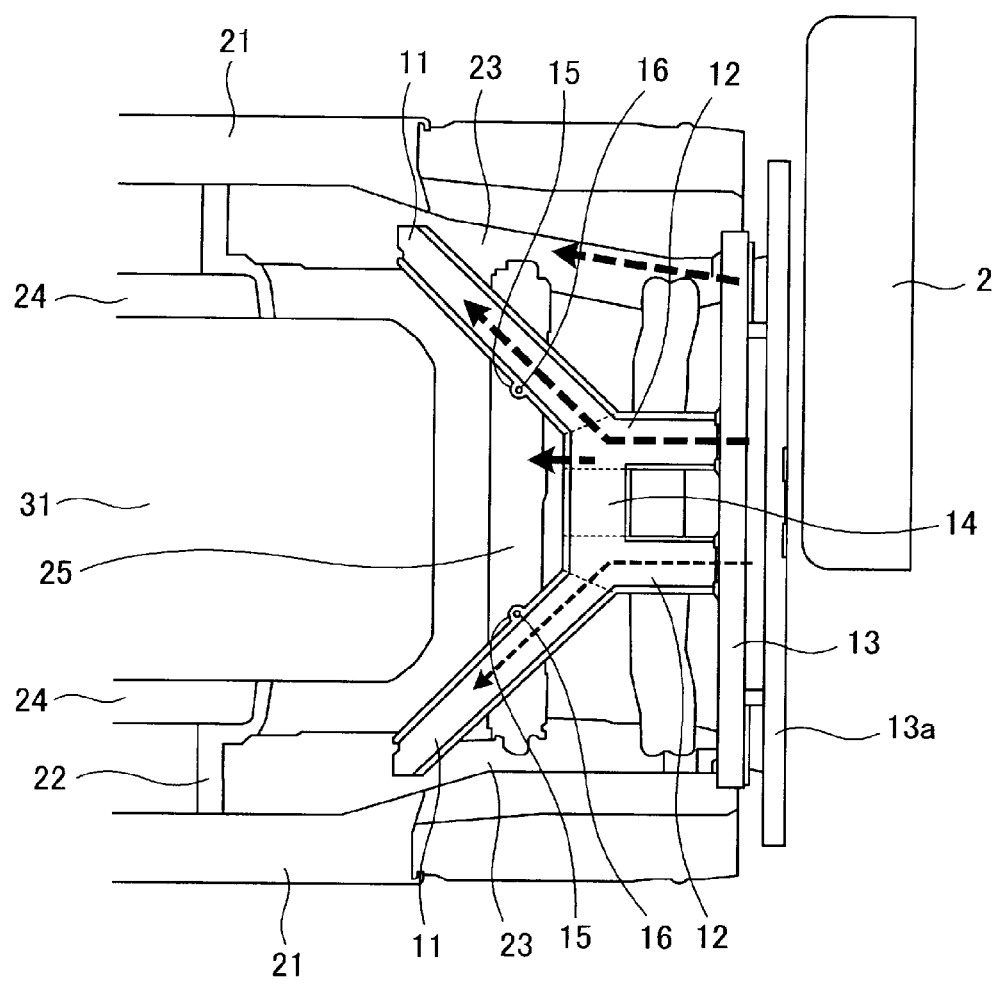
FIG. 5 is a bottom view showing the rear part structure of the vehicle (an electric vehicle) according to the embodiment 1 of the invention.

Further, FIG. 5 is a bottom view of a vehicle (an electric vehicle) according to the embodiment 1 of the invention.

As shown in FIG. 5, the rear part structure of the vehicle according to the embodiment 1 of the invention can be applied to an electric vehicle too. Specifically, the electric vehicle is usually provided with a battery pack 31. In the rear part structure of the vehicle according to the embodiment 1 of the invention, there is a space having a sufficient width between the respective one ends of the sub frame side members 11, because the one ends of the sub frame side members 11 are connected to the rear side members 23 which are disposed at the opposite ends in the lateral direction of the vehicle.

Therefore, by positioning a rear end of the battery pack 31 in the space between the respective one ends of the sub frame side members 11, it is possible to dispose the battery pack 31 without coming into contact with the sub frame 1.

The present invention is favorable, as the rear part structure of the vehicle.

According to an aspect of the invention, it is possible to efficiently absorb a shock, by converting the shock to acceleration of the vehicle, when the vehicle is collided from the back.

What is claimed is:

1. A rear part structure of a vehicle, the rear part structure comprising:
   a pair of right and left rear side members;
   a pair of side sills which are connected to the rear side members;
   a sub frame bumper beam extending in a lateral direction of the vehicle and supporting a bumper;
   a pair of sub frame side members, a front ends of the pair of sub frame side members being connected to connecting parts between the rear side members and the side sills, the pair of sub frame side members extending toward a rear of the vehicle, in a manner inclined inward in the lateral direction of the vehicle as the pair of sub frame side members extend toward the rear of the vehicle;

a sub frame center member extending toward the rear of the vehicle, a front end of the sub frame center member being connected to a rear end of each of the pair of sub frame side members, and a rear end of the sub frame center member abutting against the sub frame bumper beam, the sub frame center member being a pair of members separated from each other in the lateral direction of the vehicle;

a sub frame cross member which interconnects the pair of members of the sub frame center member; and a rear floor cross member which is connected to the pair of right and left rear side members, and overlapping an intermediate portion of the sub frame side members and which is extended in the lateral direction of the vehicle, wherein the sub frame cross member is disposed in rear of the rear floor cross member in a position at least partially vertically coextensive with respect to the rear floor cross member such that when the sub frame cross member moves in a forward direction with respect to the rear floor cross member due to a collision from a rear of the vehicle, the sub frame cross member abuts the rear floor cross member.

2. The rear part structure according to claim 1, wherein a rear end of each of the pair of members abuts against the sub frame bumper beam.

3. The rear part structure according to claim 1, wherein the sub frame bumper beam interconnects rear ends of the rear side members.

4. The rear part structure according to claim 1, wherein the vehicle is an electric vehicle which is provided with a battery pack for driving the electric vehicle, and the battery pack is positioned between the front ends of the pair of sub frame side members.

5. The rear part structure according to claim 3, wherein the vehicle is an electric vehicle which is provided with a battery pack for driving the electric vehicle, and the battery pack is positioned between the front ends of the pair of sub frame side members.

6. The rear part structure according to claim 1, wherein the pair of sub frame side members are integrally formed with the sub frame center member.

* * * * *